Figure 1:
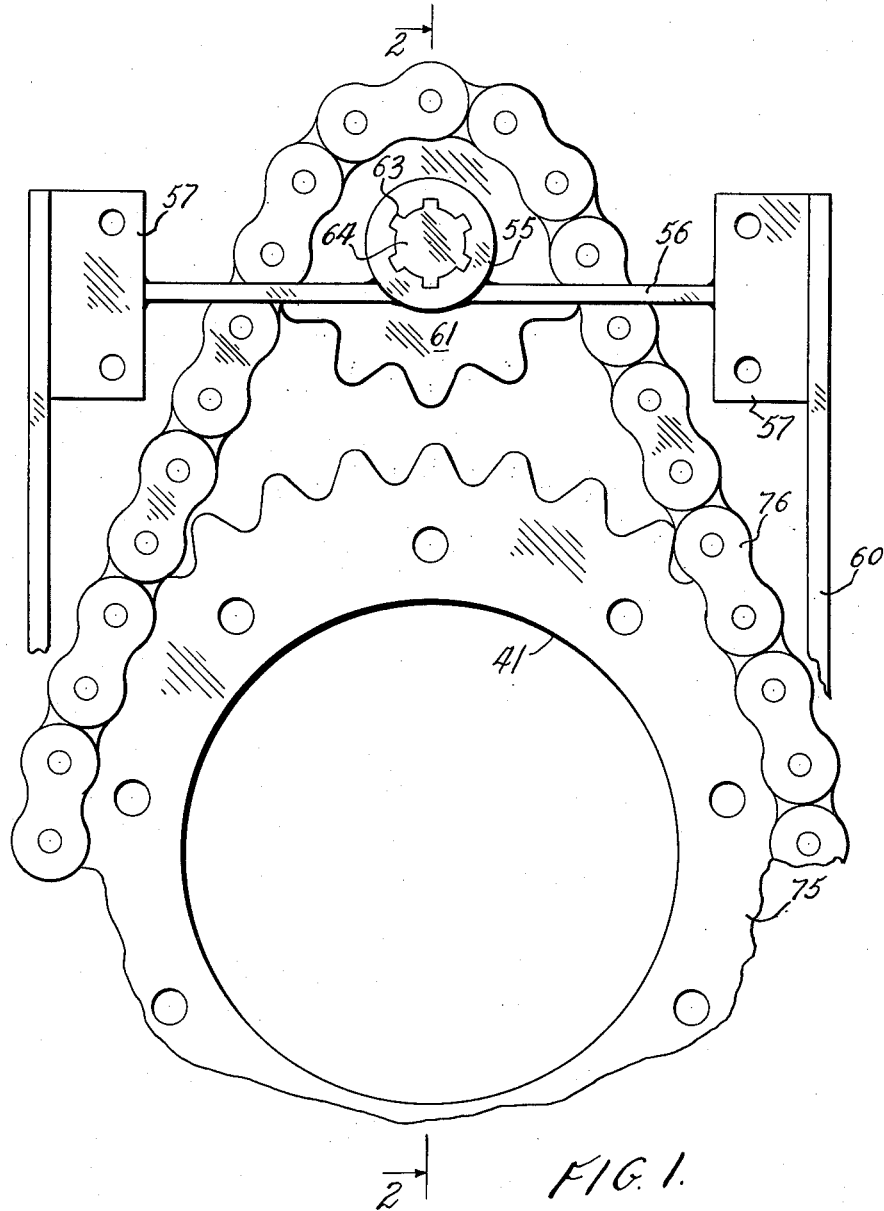

April 24, 1962 E. P. HILMER ET AL 3,031,025
TRANSMISSION
Filed April 6, 1960 2 Sheets-Sheet 1

INVENTORS
ELWYN P. HILMER
DONALD W. YOUMANS
BY
Charles L. Lovenched
ATTORNEY

April 24, 1962

E. P. HILMER ET AL 3,031,025

TRANSMISSION

Filed April 6, 1960

2 Sheets-Sheet 2

INVENTORS
ELWYN P. HILMER
DONALD W. YOUMANS
BY

ATTORNEY

United States Patent Office 3,031,025
Patented Apr. 24, 1962

3,031,025
TRANSMISSION
Elwyn P. Hilmer, 3637 Jasmine St., Denver, Colo., and Donald W. Youmans, 3940 Lone Oak Road SE., Salem, Oreg.
Filed Apr. 6, 1960, Ser. No. 20,326
9 Claims. (Cl. 180—75)

This invention relates to novel and improved means for applying driving torque to the driving wheels of heavy duty vehicles such as tractors, trucks, and the like.

The invention particularly relates to a novel and improved speed reduction drive for driving wheels such as the wheels of a tractor used in towing heavy machinery which must move at a very slow rate. An example of such machinery is a trencher of the common type used for digging in the earth. This type of trencher must move forward at a very slow rate during operation.

The speed reduction drive disclosed herein constitutes an improvement over prior devices of this nature in that it is easily installed on a tractor; that is, two men can install the speed reduction drive within two hours or less with no special tools or equipment. The speed reduction drive has no complicated or expensive special gears but utilizes external sprocket and chain driving members. The speed reduction drive does not alter the length of the tractor and, therefore, it will not affect the overall length of the tractor with a loader or a loader-pusher mounted thereon.

Since one of the speed reduction drives disclosed herein is mounted at each rear wheel of the tractor, there is no high torque load imposed upon the final drive of the tractor. The speed reduction drive will adapt to many different makes and models of tractors with only a single bracket adapter chain. It will adapt to new models of tractors which may come out in the future of the general type described herein with only minor bracket changes which may be readily made.

In addition to the range of speed changes already on the tractor, an additional creeper speed for each existing speed is provided. The tractor also retains its normal braking action, even when in the creeper or lower speed drive. The speed reduction drive is shiftable to direct drive for transportation of the tractor. The low ratio drive or speed is available for work where "creeper speed" is required.

By changing the size of the sprockets and the relative ratio thereof, any speed ratio between direct drive and one to one hundred of the already existing low speed drive, for example, is available. The speed reduction drive provides steady and positive low speed motion. The reduction sprockets are located in the wheel rims and, therefore, do not interfere with the attachments which may be mounted on the rear of the tractor.

The device can be operated with a single unit for lighter agricultural applications or with two speed reducers, one on each side, for extremely low speed applications.

It is, accordingly, an object of the invention to provide an improved and simplified construction of a reduction gear drive of the character described.

Another object of the invention is to provide an improved reduction gear drive capable of providing a two speed variation.

Still another object of the invention is to provide an improved epicyclic transmission utilizing an improved arrangement of chain and sprocket drive structure.

A further object of this invention is to provide a speed reducer for use on tractors which can be easily installed, which does not alter the length of the tractor, which introduces no high torque load on the tractor final drive, which may be adapted to numerous makes of tractors, which will provide a wide range of speed changes and ratios depending upon the type of sprockets used, which provides normal tractor braking action even in creeper drive, which may be shifted to direct drive, which provides positive creeper motion, which is located within the wheel rims of the tractor, and which may be manufactured for heavy or light duty operations.

Yet a further object of the invention is to provide a transmission which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 2:
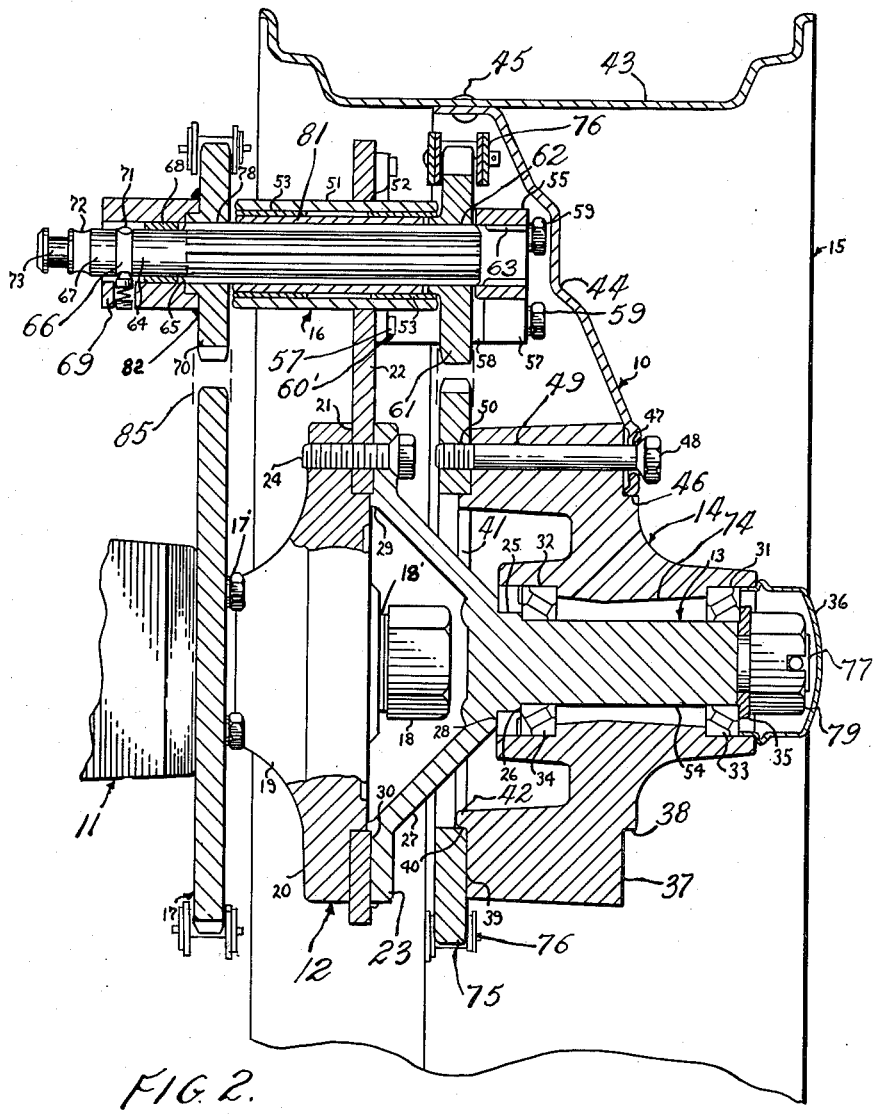

In the drawings:

FIG. 1 is a side view of a sprocket for attaching to a tractor having the hubs removed; and FIG. 2 is a cross sectional view of the reduction drive mechanism taken on line 2—2 of FIG. 1.

Now with more specific reference to the drawings, the numeral 11 indicates generally the rear axle housing of a conventional wheel type tractor of the type commonly found in use on farms and for construction projects.

A speed reducer 10 is shown supported on the tractor and in combination therewith. The speed reducer 10 is connected to one rear housing 11 of the tractor. A similar speed reducer may be connected to the other rear housing of the tractor or the speed reducer shown can be used on one wheel of the tractor only and the speed reduction can be accomplished to the other wheel through the regular differential gear system of the tractor.

The major components of the speed reducer 10 are an auxiliary axle 13, an auxiliary hub 14, a tractor wheel 15, a planetary assembly 16, a tractor hub 12, and a sun sprocket 17. The sun sprocket 17 is fixed to the housing 11 by bolts 17'. The tractor hub 12 has a bore therethrough which receives a tractor axle 18 and which has a nut on the end thereof. The hub 12 is keyed to the axle 18 in any suitable manner that a driving wheel of a tractor is ordinarily keyed to a tractor axle and held thereby by a threaded nut 18'. The hub 12 has a body portion 19 and an outwardly extending flange 20. The flange 20 is in the form of an annular plate in configuration and is disposed concentric to the axle 18.

A groove 21 in the outer end surface of the hub 12 adjacent the outer periphery receives a plate like planet carrier 22. An outwardly extending flange 23 of the auxiliary axle 13 overlies the inner portion of the planet carrier 22 and has spaced holes therein which register with holes in the planet carrier 22 and with threaded holes in the flange 20. These aligned holes receive bolts 24. The bolts 24 extend through the holes in the flange 23 through spaced bores in the planet carrier 22 and threadably engage threaded holes in the flange 20 of the body portion 19. Therefore, the portion 19, the planet carrier 22, and the auxiliary axle 13 are rigidly attached together and rotate with the axle 18. The auxiliary axle 13 is in axial alignment with the axle 18.

The auxiliary axle 13 has a bearing surface 54 which terminates at its inner end at a shoulder 26 defining an enlarged cylindrical portion 25. The enlarged portion 25 terminates adjacent a frusto-conical web portion 27 at a shoulder 28. The frusto-conical web portion 27 has the outwardly extending flange 23 integrally attached thereto and the flange 23 is fixed to the hub 12 by the bolts 24 as described above. The auxiliary axle 13 is positively located relative to the hub 12 by a rim 29 which extends around the inner edge of a flat surface 30 which is clamped against the planet carrier 22.

The auxiliary hub 14 is generally cylindrical in shape. It is supported on the auxiliary axle 13 and freely rotatable thereon. The auxiliary hub 14 has a bore 74 therethrough which is counterbored at each end at 31 and 32 and these counterbores receive anti-friction bearings 33 and 34. The outer end of the auxiliary axle 13 has a reduced size threaded portion 77 which receives a nut 79 and a washer 35. The washer 35 engages the bearing 33 and it urges it inwardly and it, in turn, being disposed in the counterbore 31, urges the hub inwardly so that the bearing 34 is positively clamped between the shoulder 26 and the shoulder defined by the counterbore 32. The bearing 33 in turn is positively clamped between the shoulder defined by the counterbore 31 and the washer 35. A cap 36 of the type familiar to those skilled in the art is supported on the end of the auxiliary hub 14 to protect the bearings therein from dirt and foreign objects.

The auxiliary hub 14 has an outer annular surface 37 terminating at its inner edge in a shoulder 38 and an annular machine surface 39 terminating at its inner edge in a shoulder 40. A sprocket 75 has an internal bore 41 which receives a rim 42 and one edge of the ring sprocket rests against the shoulder 40 of the hub 14.

The wheel 15 may be a suitable wheel which would ordinarily be used on a tractor such as indicated at 11. The wheel 15 has a rim 43 for supporting a pneumatic tire. The rim 43 is attached to an inner portion 44 by rivets 45. The wheel 15 has a bore 46 which receives and rests against the surface 37 of the auxiliary hub 14. Spaced holes 47 receive elongated studs 48. The studs 48 extend through the holes 47 in the wheel 15 and through spaced bores 49 in the hub 14 and threadably engage bores 50 in the ring sprocket 75. Therefore, the auxiliary hub 14, the wheel 15, and the ring sprocket 75 are clamped together and they rotate as a unit on the auxiliary axle 13.

The planetary assembly 16 is carried on the planet carrier 22 which is fixed to rotate with the hub 12 and the auxiliary axle 13 as aforesaid. A tubular planet hub 51 extends through a bore 52 in the carrier 22 and is welded thereto. The planet hub 51 has concentrically disposed, spaced, hollow, cylindrical anti-friction bearing members 53 which receive a bushing 81. The bushing 81 is rotatably received in the bearing members 53 and has a splined internal bore complementary to and receiving a splined axle 64 so that the bushing 81 rotates with the axle 64 and wear on the splines is therefore reduced.

A locking hub 55 is welded to a laterally extending bracket 56 which has plates 57 welded to each end thereof. The plates 57 are bolted to brackets 58 by bolts 59. Therefore, the locking hub 55 can be removed from the brackets 58 by removing the bolts 59. The brackets 58 are welded to upwardly extending vertical brackets 60 which are attached to the planet carrier 22 and are an integral part of the planet carrier 22.

A planet sprocket 61 has an internally splined bore 62 in the hub thereof. A sprocket 70 is connected to the stationary sprocket 17 by a chain 85. The sprocket 70 has a splined bore 78. The locking hub 55 has a splined bore 63. The bores 78, 62, and 63 slidably receive the shift axle 64.

The shift axle 64 has splines on the outside thereof which hold it against rotation in the bores 62, 63, and 78. The shifting axle 64 may move from the position shown with the splines thereon engaging the bores 62 and 78. The splines on the shift axle 64 terminate at 65 and a cylindrical end portion 67 extends outwardly from the terminus 65. The cylindrical end portion 67 is received in a bearing 68 in a hollow cylinder bearing support hub 69 which is welded to the planetary sprocket 70 at 82.

The splined portion of the axle 64, when shifted to the right, brings the cylindrical part thereof to be received in the splined bore of the sprocket 70. When the axle 64 is thus shifted, the sprocket 70 can rotate freely thereon.

The support hub 69 has spring loaded detents 71 supported therein which engage a groove 66 when the shifting axle 64 is in the position shown. In this position, the sprockets 61 and 70 are locked together by the shifting axle 64. The detents 71 engage a groove 72 when the shifting axle 64 is moved to the right to bring the splined bore 62 into engagement with the splines in the bore 63. In this position, the sprockets 61 and 70 orbit simultaneously and the sprocket 61 is fixed to the hub 55. The shifting axle 64 has a peripheral groove 73 for receiving a shifting linkage or the like to connect it to a suitable shifting handle.

The planet sprocket 61 is connected to the sprocket 75 by a chain 76 and the sprocket 70 is connected to the sprocket 17 by a similar chain 17'.

In the creeper or low speed position, the sprockets 61 and 70 are locked together by the shifting axle 64. The shifting axle 64 is supported on the portion 19 and rotates therewith. If the sprockets 17 and 75 were of exactly equal ratio to the sprockets 70 and 61, respectively, there would be no drive since the sprockets 61 and 70 would merely free wheel around the sprockets 17 and 75; however, the sprockets 70 and 61 do not have an equal number of teeth in the example shown. The sprocket 75 has more teeth than the sprocket 17. Therefore, upon each revolution of the portion 19, the sprocket 75 will be driven forward an amount equal to the different number of teeth which the sprocket 75 has from the sprocket 17; that is, if the sprocket 75 has one more tooth than the sprocket 17, the minimum speed ratio will be provided. On the other hand, if the sprocket 75 has a considerably larger number of teeth than the sprocket 17, a maximum speed ratio for the shifted position will be provided.

In the direct drive position, when the shifting axle 64 is shifted to the right so that the sprocket 70 free wheels and the sprocket 61 is locked to the locking hub 55, the sprocket 61 will be swung around with the hub 12 and will also be swung around the sprocket 75. Therefore, a direct drive will be provided between the hub 12 and the hub 14 through the chain 76.

When the shifting axle 64 is moved to the right to engage the splined bore 62 in the sprocket 61 and the splined bore 63 in the locking hub 55, the planet sprocket 61 will be held against rotation relative to the locking hub 55 and, therefore, the sprocket 61 will be swung without rotation around the sun sprocket 17 and the sprocket 70 will be restrained in its rotation by the sun sprocket 17. Therefore, speed ratio will be transmitted from the axle 18 to the sprocket 75 to which the wheel is attached. Therefore, a first speed can be accomplished with the shifting axle 64 in the position shown and a second speed by shifting the shifting axle 64 to the right.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A speed reducer for a machine having a stationary housing and a rotatable axle, comprising a toothed sun member stationarily fixed to said housing, a planet carrier and a wheel supporting means fixed to said axle to rotate therewith, a wheel rotatably supported on said wheel supporting means, a toothed ring member fixed to and rotatable to said wheel and concentric to said axle, toothed planetary members carried by said planet carrier, means connecting said planetary members with said sun member and to said ring member, said planet carrier carrying said planetary members around said sun member and said ring member whereby a force is transmitted from said sun member to said ring member, means on said planet carrier to selectively lock one said planetary member against relative rotation to said planet carrier, and means to lock said planetary members to rotate together.

2. The speed reducer recited in claim 1 wherein said planetary members comprise two axially spaced toothed members rotatable about a common axis, said means to lock said planetary members being shiftable to allow one said toothed planetary member to rotate freely and to restrain said other toothed planetary member against rotation relative to said planet carrier.

3. A speed reducer for use with a tractor having a stationary housing with a rotatable axle extending therefrom, a sun sprocket disposed concentric to said axle and stationarily fixed to said housing, a planetary carrier fixed to said axle and rotatable therewith and extending radially therefrom, spaced planetary sprockets rotatably supported on said planetary carrier to rotate about a common axis, a chain disposed around one said planetary sprocket and around said sun sprocket, a wheel rotatably supported on said axle, a ring sprocket attached to said wheel and rotatable therewith, a chain connecting another said planetary sprocket to said ring sprocket, and shifting means connecting said planetary sprockets to rotate together, said shifting means being shiftable to allow one said planetary sprocket to rotate independent of the other and to fix the other said planetary sprocket against rotation relative to said planetary carrier.

4. A speed reducer comprising a fixed sprocket, an axle concentric with and rotatable relative to said fixed sprocket, a driving member rotatably supported on said axle, a planet carrier fixed to and rotatable with said axle, a ring sprocket attached to and rotatable with said driving member, two spaced planet sprockets carried by said planet carrier, a continuous chain around said fixed sprocket and one said planet sprocket, a chain around said ring sprocket and the other said planet sprocket, and shifting means locking said planet sprockets together to rotate freely on said planet carrier, said shifting means shiftable to lock the other of said planet sprocket against rotation on said planet carrier.

5. The speed reducer recited in claim 4 wherein said driving member comprises a wheel for a tractor having a rim to support a pneumatic tire thereon.

6. In combination, a wheeled vehicle and a speed reducer thereon, said vehicle having a stationary housing and a rotatable axle, comprising a toothed sun member fixed to said housing, a planet carrier and a wheel support fixed to said axle to rotate therewith, a wheel rotatably supported on said wheel support, a toothed ring member fixed to and rotatable with said wheel and concentric to said axle, toothed planetary members carried by said planet carrier, means connecting said planetary members with said sun member and to said ring member, said planet carrier carrying said planetary members around said sun member and said ring member whereby a force is transmitted from said sun member to said ring member, means on said planet carrier to selectively lock one said planetary member against relative rotation to said planet carrier, and means to lock said planetary members to rotate together.

7. The combination recited in claim 6 wherein said means to lock said planetary members to rotate together comprises a member shiftable to allow one said toothed planetary member to rotate freely and to restrain said other toothed planetary member against rotation relative to said planet carrier.

8. In combination, a wheeled vehicle and a speed reducer, said vehicle having a stationary housing with an axle extending therefrom and rotatable relative thereto, a sun sprocket disposed concentric to said axle and stationarily fixed to said housing, a planetary carrier fixed to said axle and extending radially therefrom and rotatable therewith, spaced planetary sprockets rotatably supported on said planetary carrier to rotate about a common axis, a chain disposed around one said planetary sprocket and around said sun sprocket, a wheel rotatably supported on said axle, a ring sprocket attached to said wheel and rotatable therewith, a chain connecting another said planetary sprocket to said ring sprocket, and shifting means connecting said planetary sprockets to rotate together, said shifting means being shiftable to allow one said planetary sprocket to rotate independent of the other and to fix the other said planetary sprocket against rotation relative to said planetary carrier.

9. In combination, a wheeled vehicle and a speed reducer therefor, said vehicle having a stationary housing with an axle extending therefrom and rotatable relative thereto, a sun sprocket stationarily attached to said housing concentric to said axle, said axle having a hub attached thereto, said hub having an outwardly directed flange thereon, an auxiliary axle, said auxiliary axle having an outwardly directed flange attached to said flange on said hub, a planet carrier attached to said hub and extending radially outwardly therefrom, a wheel rotatably supported on said auxiliary axle, a ring sprocket fixed to said wheel and rotatable therewith and concentric to said auxiliary axle, a planet hub rigidly attached to said planet carrier, a splined shift axle rotatably supported in said planet hub, planet sprockets having splined bores supported on said shift axle and restrained by said splines to rotate therewith, said shift axle being movable laterally to disengage one said planet sprocket whereby said planet sprockets rotate relative to said other, and means to lock one said planet sprocket, said ring sprocket being connected to one said planet sprocket to rotate therewith and said sun sprocket being connected to the other said planet sprocket to rotate it as the axle rotates in said housing.

References Cited in the file of this patent

UNITED STATES PATENTS

| | | |
|---|---|---|
| 2,557,485 | Wagner | June 19, 1951 |
| 2,598,876 | Ash | June 3, 1952 |
| 2,795,286 | Lehman | June 11, 1955 |
| 2,913,064 | Ferguson et al. | Nov. 17, 1959 |